United States Patent [19]

Neese

[11] 4,399,427

[45] Aug. 16, 1983

[54] REVERSE ALARM

[75] Inventor: James A. Neese, Flora, Ill.

[73] Assignee: Sparton Corporation, Jackson, Mich.

[21] Appl. No.: 260,793

[22] Filed: May 5, 1981

[51] Int. Cl.³ .......................... G08B 3/00; G10K 9/12
[52] U.S. Cl. .................................. 340/388; 340/384 E; 340/387
[58] Field of Search ............... 340/384 R, 384 E, 388, 340/402, 404, 405; 116/155

[56] References Cited

U.S. PATENT DOCUMENTS

| 2,545,961 | 3/1951 | Levy | 181/31 |
| 2,957,054 | 10/1960 | Levy et al. | 179/115.5 |
| 3,028,927 | 4/1962 | Levy et al. | 181/27 |
| 3,076,960 | 2/1963 | Knutson | 340/402 X |
| 3,432,002 | 3/1969 | Cohen | 181/31 |
| 3,454,729 | 7/1969 | Seebinger | 179/115.5 |
| 3,728,676 | 4/1973 | Brown | 340/384 E |
| 4,310,833 | 1/1982 | Sakaguchi | 340/384 E |

Primary Examiner—John W. Caldwell, Sr.
Assistant Examiner—Daniel Myer
Attorney, Agent, or Firm—Beaman & Beaman

[57] ABSTRACT

An electronic alarm particularly designed to indicate reverse movement of vehicles. The alarm utilizes a synthetic plastic housing having a cavity defined therein which intersects the housing at an exterior surface. A sound producing diaphragm, the motor for vibrating the diaphragm, and the electronic control circuit, are all mounted upon a diaphragm mounting assembly which is received within the housing cavity forming a cavity cover. The diaphragm is located in opposed relationship to a cavity sound reflective base, and an air passage surrounding the diaphragm mounting assembly transmits sound vibrations through the cavity, and through ports defined in the diaphragm assembly at the cavity opening.

6 Claims, 4 Drawing Figures

REVERSE ALARM

BACKGROUND OF THE INVENTION

Safety standards require that heavy duty vehicles such as used in construction and mining employ alarms for indicating reversing movement of the vehicle. Such alarms are controlled by the vehicle transmission shifting apparatus wherein a clearly audible and distinctive alarm signal is emitted to warn personnel of the reverse movement of the vehicle.

Such reversing alarms are subjected to high abuse and stringent duty cycles, and must be capable of dependable operation under adverse weather conditions and the extensive vibration to which they are subjected by vehicle operation.

It is an object of the invention to provide a reverse alarm for vehicles which is of concise configuration, high strength construction, and capable of producing a high decibel warning signal.

It is a further object of the invention to provide a reversing alarm for vehicles utilizing a synthetic plastic housing and electronic circuitry wherein the alarm is weatherproof, and may be cleaned by steam or sprays without damage thereto.

A further object of the invention is to provide a reversing alarm for vehicles which may be economically manufactured and assembled, and wherein the alarm may be readily mounted upon the associated vehicle in either a vertical or horizontal orientation.

An additional object of the invention is to provide a reversing alarm for vehicles utilizing an electronic circuit wherein the circuit components are totally encapsulated within a dielectric waterproof potting compound protecting the circuitry from shorting or failure due to vibration.

In the practice of the invention the reversing alarm includes a molded synthetic plastic housing having a dish shaped cavity defined therein which includes a circular opening intersecting an exterior surface of the housing. The cavity is defined by a sidewall intersecting a sound reflective base facing the cavity opening, and the base is of such a configuration as to efficiently reflect sound vibrations axially received thereon.

A diaphragm mounting assembly is located within the housing cavity, and includes an inner end upon which a vibratable diaphragm or cone is mounted for spaced opposed relationship to the cavity base surface. The diaphragm mounting assembly also includes an outer end upon which a radial flange is defined which cooperates with the cavity opening and seals the same to function as a cavity cover. The diameter of the diaphragm mounting assembly is less than the diameter of the cavity whereby an annular air passage is defined between the assembly and the cavity sidewall, and ports defined in the assembly flange permit sound vibrations generated by the diaphragm to be reflected from the cavity base along the lateral portions of the assembly and through the flange ports.

Electronic circuit components which energize the motor for vibrating the diaphragm are located within a recess defined in the diaphragm mount assembly, and these components are encapsulated within a potting compound rendering the circuit waterproof, and the components mechanically supported against vibration. The diaphragm mounting assembly is assembled prior to being placed within the housing cavity, and upon the interconnection of wiring between the circuitry and the housing the assembly is placed within the cavity and bonded thereto wherein the assembly flange seals the housing opening, and engaging bracing and support structure located upon the assembly cooperating with complementary shaped recesses and abutments within the housing cavity provide mechanical support for the diaphragm mounting assembly.

The housing is provided with extensions having holes defined therein for receiving mounting bolts or fasteners, and the holes are disposed at 90° to each other to permit either horizontal or vertical mounting of the alarm, and provide universal alarm mounting options.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
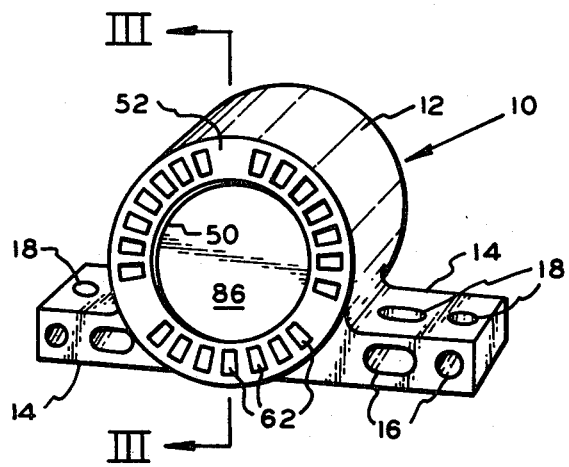
FIG. 1 is a front perspective view of a reverse alarm in accord with the invention.
Figure 2:
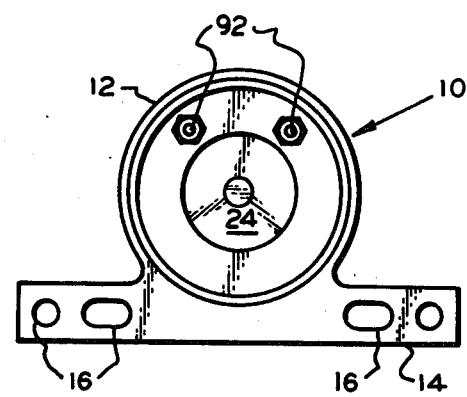
FIG. 2 is a rear elevational view of the alarm.

The exterior appearance of the reversing alarm in accord with the invention will be appreciated from FIGS. 1 and 2. The alarm includes a housing 10 which is molded of a synthetic plastic material such as ABS, and the housing consists of a substantially cylindrical central portion 12 from which extend a pair of mounting brackets or legs 14 homogeneously defined of the housing material. The brackets 14 each include a pair of horizontally disposed openings 16 extending therethrough, and also each include a pair of vertically extending openings 18 extending therethrough. As the openings 16 and 18 are disposed at right angles to each other, and include both cylindrical and oblong configurations, these openings permit bolts, or similar fasteners, to extend therethrough for mounting the housing 10 to the rear of a heavy duty construction or mining vehicle in a firm manner. The openings permit the housing to be mounted in either a horizontal or vertical orientation.

Figure 3:
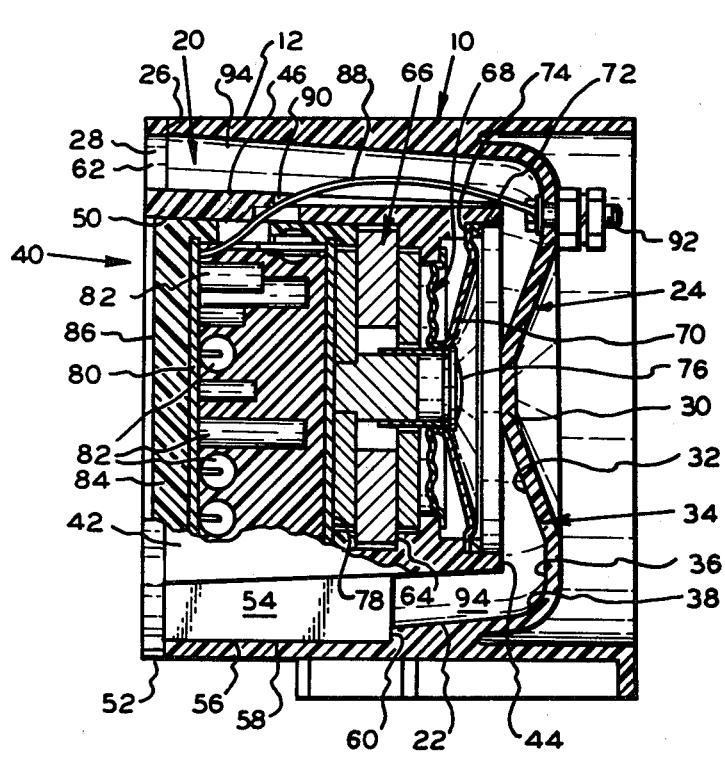
FIG. 3 is a diametrical sectional view, partially in elevation, as taken through the alarm housing along section III—III of FIG. 1.
Figure 4:
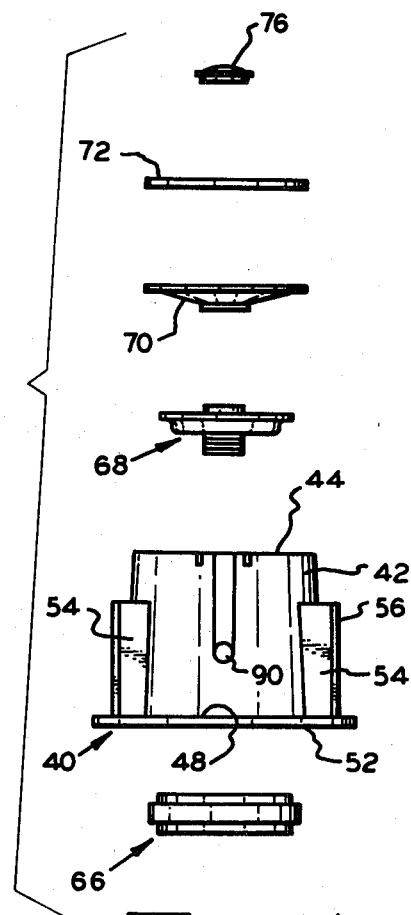
FIG. 4 is an exploded view of the diaphragm mounting assembly illustrating the diaphragm related components in elevation.

Internally, the housing portion 12 includes a dish shaped cavity generally indicated at 20, FIG. 3, which is defined by a conical sidewall 22 intersecting a base projector wall 24. The cavity 20 intersects the exterior surface of the housing portion 12 at the radial surface 26, FIG. 3, perpendicularly disposed to the axis of the cavity. The surface 26 defines the cavity opening 28.

The cavity inner base projector wall 24 includes a central region 30 which extends toward the opening 28 and is defined by a conical surface 32, FIG. 3, converging toward the cavity axis. The peripheral region of the projector wall, as indicated at 34, includes annular radial surface 36 which intersects surface 32 and is tangential to the concave radius 38 which tangentially intersects the cavity sidewall 22. As will be later apparent, the configuration of the projector wall 24 is such that sound vibrations engaging the projector wall in an axial direction will be deflected toward the radii 38, for reflection from the cavity adjacent the sidewall 22.

The cavity 20 receives a diaphragm mounting assembly generally indicated at 40, and this assembly is formed by an annular member 42, preferably of a synthetic plastic material, having an inner end 44, a peripheral wall 46, and an outer end 48. A recess 50 is defined within the member 42 open to the outer end 48 thereof, and the outer end includes a radially extending homogeneous flange 52 having a diameter which corresponds to the diameter of the housing portion 12. The member 42 is provided with three radially extending fins 54 projecting from the wall 46 adjacent end 48, and the fins 54 axially extend about one-half the length of member 42 and include outer edges 56 which are received within narrow grooves 58 defined within the walls of cavity 20. The grooves 58 include abutment shoulders 60 engaging the ends of the fins 54, and in this manner the fins radially and axially align and maintain the assembly 40 within the housing cavity 20. When the diaphragm mounting assembly 40 is mounted within the the cavity 20 as shown in FIG. 3, the assembly flange 52 overlies the cavity opening 28 and engages surface 26, and the flange is provided with a plurality of ports 62 which establish communication between the atmosphere and the cavity adjacent the sidewall 22. The flange 52 is bonded to the housing edge 26 by a suitable adhesive.

The member 42 includes a radial shoulder 64, and this shoulder receives and positions the permanent magnet and plate assembly 66, which is of an annular form. The voice coil and spider assembly 68 is mounted within the member 42 within and to the right of magnet and plate assembly 66, and this assembly includes the coils for producing the magnetic field which vibrates the diaphragm. The diaphragm, or cone 70, attaches to the voice coil and spider assembly 68, and is peripherally supported to the member 42 by gasket 72 at shoulder 74, and the end of the voice coil and spider assembly 68 is enclosed by the dust cap 76. Accordingly, it will be appreciated that the diaphragm 70 is coaxially aligned with the axis of the cavity projector wall 24, and is in opposed facing relationship thereto, and the assemblies 66 and 68 comprise a motor for vibrating the diaphragm.

A partition plate 78 is interposed between the magnet and base assembly 66, and the assembly recess 50, and the printed circuit board 80, and associated electronic components, generally indicated at 82, mounted thereon are located within the recess 50 between the partition and the open end of the recess. A potting compound 84 fills the recess 50 to encapsulate the printed circuit board and its electronic components, and the potting compound seals the recess at surface 86. Surface 86 may be covered with a nameplate decal of an attractive nature which sets forth the identification and specifications of the reverse alarm.

Conductors 88 extending from the printed circuit board 80 through an opening 90 defined in the wall 46 of assembly 40 are connected to terminals 92, FIGS. 2 and 3, mounted upon the cavity projector wall 24. Power supply conductors, not shown, are attached to the terminals 92 for energizing the alarm, as well known.

The particular circuit mounted upon the printed circuit board 80 does not constitute a part of the inventive concept as a variety of circuits may be employed. The power supply to the circuit will be direct current, and the circuitry should be of such design as to produce 112 decibels from 12 to 36 volts, of direct current supply. The vibration of the diaphragm is such to emit a 1100 Hz tone for a half second duration every second by energization of the coils of the assembly 68 by the circuit.

As will be appreciated from FIG. 3, the diameter of the diaphragm mounting assembly wall 46 is considerably less than the diameter of the housing cavity sidewall 22 whereby an annular air passage 94 is defined intermediate the assembly 40 and the sidewall 22. At the right, FIG. 3, this air passage communicates with the cavity projector wall 24 at its peripheral region 34, and at the left the air passage 94 communicates with the flange ports 62. Sound vibrations produced by the rapid oscillation of the diaphragm 70 upon energizing of the circuit will be directed against the projector wall 24 and pass through the air passage 94 and from the ports 62, and the relatively short travel distance through the air passage will not significantly reduce the decibel output.

By incorporating the diahragm motor assembly 66–68, the diaphragm components 70–72, and the electronic circuitry 80–82, within the assembly 40, and locating the assembly 40 within the housing cavity 20, a most concise alarm arrangement is produced, yet excellent audio projection is obtained. The construction fully protects the components within the assembly 40 from the weather, and moisture, and the alarm may be steam or spray cleaned without damage thereto. Any water entering the ports 62 will drain from the lowermost port keeping the air passage 94 free of foreign matter.

The assembly 40 is fully assembled, and potted, prior to insertion into the housing cavity 20, permitting the alarm to be readily assembled during manufacture while the related components are readily accessible. However, as the assembly 40 is bonded to the housing 10 by an adhesive the alarm is relatively "tamperproof", and cannot readily be modified by unauthorized personnel.

It is appreciated that various modifications to the inventive concepts may be apparent to those skilled in the art without departing from the spirit and scope of the invention.

I claim:

1. An electronic alarm comprising, a housing, mounting means formed on said housing, said housing including a dish shaped cavity defined by a sidewall and an inner projector wall intersecting said sidewall, said cavity including an opening intersecting an exterior surface of said housing, said projector wall facing said opening, a diaphragm mount assembly located within said cavity having an axis and an inner end and an outer end, a sound producing diaphragm supported upon said assembly inner end, diaphragm vibrating means supported on said assembly inner end operatively connected to said diaphragm, control means controlling operation of said diahragm vibrating means mounted upon said diaphragm mount assembly, a flange defined on said diaphragm mount assembly outer end radially disposed to said assembly axis and extending outwardly with respect to said axis, said flange overlying said cavity opening at the intersection thereof with said housing exterior surface and in alignment with said cavity sidewall, means affixing said flange to said housing at said cavity opening, air passage means defined between said diaphragm mount assembly and cavity sidewall communicating with said opening and said projector wall, port means defined in said flange in alignment with said air passage means, said diaphragm being disposed in opposed spaced relation to said inner projector wall whereby sound vibrations produced by said diaphragm reflect from said projector wall through said air passage means and port means.

2. In an electronic alarm as in claim 1, said inner projector wall including a central region in axial alignment with said diaphragm mount assembly axis and a peripheral region adjacent said sidewall, said central region axially extending toward said opening and said peripheral region axially extending away from said opening adjacent said central region and tangentially intersecting said sidewall with a radius to receive and deflect sound vibrations into said air passage means.

3. In an electronic alarm as in claim 1, said housing, sidewall and projector wall being homogeneously constructed of a synthetic plastic material.

4. In an electronic alarm as in claim 1, said diaphragm mount assembly having a recess defined therein, said control means comprising electronic circuit components mounted within said recess, and a waterproof dielectric potting material within said recess surrounding said circuit components.

5. In an electronic alarm as in claim 4 wherein said recess intersects said diaphragm mount assembly outer end, and said potting compound seals said recess against entry by foreign matter.

6. In an electronic alarm as in claim 1, said port means comprising a plurality of axially extending openings defined in said assembly flange.

* * * * *